United States Patent
Itomi

(10) Patent No.: US 10,359,083 B2
(45) Date of Patent: Jul. 23, 2019

(54) REVERSE INPUT BLOCKING CLUTCH

(71) Applicant: NTN CORPORATION, Osaka (JP)

(72) Inventor: Shoji Itomi, Mie (JP)

(73) Assignee: NTN Corporation, Osaka (JP)

( * ) Notice: Subject to any disclaimer, the term of this patent is extended or adjusted under 35 U.S.C. 154(b) by 133 days.

(21) Appl. No.: 15/116,034

(22) PCT Filed: Feb. 10, 2015

(86) PCT No.: PCT/JP2015/053611
§ 371 (c)(1),
(2) Date: Aug. 2, 2016

(87) PCT Pub. No.: WO2015/122399
PCT Pub. Date: Aug. 20, 2015

(65) Prior Publication Data
US 2017/0175825 A1   Jun. 22, 2017

(30) Foreign Application Priority Data

| Feb. 14, 2014 | (JP) | 2014-026258 |
| Feb. 28, 2014 | (JP) | 2014-038378 |
| Feb. 28, 2014 | (JP) | 2014-038402 |

(51) Int. Cl.
*F16D 41/066* (2006.01)
*F16D 43/02* (2006.01)
*F16D 41/10* (2006.01)

(52) U.S. Cl.
CPC ......... *F16D 41/066* (2013.01); *F16D 41/105* (2013.01); *F16D 43/02* (2013.01); *F16D 2300/10* (2013.01)

(58) Field of Classification Search
USPC .................................................. 192/45.004
See application file for complete search history.

(56) References Cited

U.S. PATENT DOCUMENTS

| 3,380,563 A | 4/1968 | Bowers et al. |
| 5,896,973 A * | 4/1999 | Hochmuth ............... B60N 2/02 |
| | | 192/223.2 |

(Continued)

FOREIGN PATENT DOCUMENTS

| CN | 1877152 | 12/2006 |
| EP | 1 101 967 | 5/2001 |

(Continued)

OTHER PUBLICATIONS

Extended European Search Report dated Feb. 14, 2017 in corresponding European Application No. 15749347.9.

(Continued)

*Primary Examiner* — Mark A Manley
(74) *Attorney, Agent, or Firm* — Wenderoth, Lind & Ponack, L.L.P.

(57) ABSTRACT

In a locking type reverse input blocking clutch, smooth finished surfaces having no directionality are formed, by barrel polishing, on surfaces brought into contact with rollers while rotation is being transmitted from the input side to the output side, i.e. an inner peripheral cylindrical surface of an outer ring and a surface of a lid portion opposed to the rollers. With this arrangement, it is possible to reduce the sliding resistance between the rollers and the outer ring and between the rollers and the lid portion, without the need to reduce the forces of springs for pushing the rollers into narrow portions of wedge-shaped spaces. This in turn makes it possible to reduce the torque necessary to transmit rotation from the input side to the output side, while maintaining high locking performance.

1 Claim, 8 Drawing Sheets

(56) References Cited

U.S. PATENT DOCUMENTS

| | | | | |
|---|---|---|---|---|
| 2001/0013453 A1* | 8/2001 | Hori | ................ | F16D 41/064 |
| | | | | 192/45.019 |
| 2005/0006193 A1* | 1/2005 | Kim | ................ | B60N 2/167 |
| | | | | 192/15 |
| 2006/0278494 A1* | 12/2006 | Itomi | ................ | F16D 41/105 |
| | | | | 192/223.2 |
| 2012/0305359 A1* | 12/2012 | Sato | ................ | B60N 2/1615 |
| | | | | 192/45.001 |

FOREIGN PATENT DOCUMENTS

| | | |
|---|---|---|
| JP | 2003-90359 | 3/2003 |
| JP | 2007-232095 | 9/2007 |
| JP | 2008-309222 | 12/2008 |
| JP | 2009-287680 | 12/2009 |
| JP | 2009-299864 | 12/2009 |
| JP | 2010-019343 | 1/2010 |
| JP | 2013-50175 | 3/2013 |
| JP | 4965871 | 4/2014 |
| WO | 2006/115343 | * 11/2006 |
| WO | 2008/035597 | 3/2008 |
| WO | 2010/004880 | 1/2010 |

OTHER PUBLICATIONS

"Understanding the Basics of Barrel Tumbling Detailed Finishing Guide", Jan. 14, 2013, XP055340952, Retrieved from the Internet: URL:http://www.kramerindustriesonline.com/finishing-guides/barrel-finishing-guide.htm.

International Preliminary Report on Patentability and Written Opinion of the International Searching Authority dated Aug. 16, 2016 in corresponding International (PCT) Application No. PCT/JP2015/053611.

Office Action dated Feb. 24, 2018 in Chinese Application No. 201580005753.4, with partial English translation.

* cited by examiner

REVERSE INPUT BLOCKING CLUTCH

TECHNICAL FIELD

This invention relates to a reverse input blocking clutch configured to transmit rotation of an input-side member to an output-side member when input torque is applied to the clutch, and prevent rotation of the input-side member if reverse input torque is applied to the clutch.

BACKGROUND ART

Reverse input blocking clutches are configured to transmit rotation of an input-side member to an output-side member when input torque is applied to the clutch, and prevent rotation of the input-side member if reverse input torque is applied to the clutch. One type of such reverse input blocking clutches are configured to lock the output-side member if reverse input torque is applied (this type of reverse input blocking clutches are hereinafter referred to as "locking type (reverse input blocking) clutches"), and are frequently used when it is required that the output-side member maintain its position even after the motor that applied input torque to the input-side member stops, or if the motor stops when it is not supposed to, due e.g., to power outage.

Among such locking type reverse input blocking clutches, one type of well known clutch includes a torque transmission arrangement disposed between an input-side member and an output-side member which are configured to rotate about a common axis, and the torque transmission arrangement is configured to transmit rotation of the input-side member to the output-side member with a slight angular delay. A fixed outer ring has a cylindrical surface on the inner peripheral side thereof and disposed radially outwardly of the output-side member. The output-side member has an outer peripheral surface formed with a plurality of cam surfaces such that a wedge-shaped space which gradually narrows toward its respective circumferential ends is defined between the cylindrical surface of the fixed outer ring and each of the cam surfaces of the output-side member. A pair of rollers as engaging elements and a spring as an elastic member are mounted in each wedge-shaped space such that the rollers are pushed into the respective narrow end portions of the wedge-shaped space. A retainer is provided which includes pillars inserted in both circumferential end portions of the respective wedge-shaped spaces, and which is coupled to the input-side member so as to rotate in unison with the input-side member (see, for example, Japanese Patent 4965871B).

With this type of reverse input blocking clutch, since the rollers are pushed into the narrow end portions of the respective wedge-shaped spaces under the biasing force of the springs, if reverse input torque is applied to the output-side member, the rotationally rearward rollers engage the fixed outer ring and the output-side member, thereby locking the output-side member, so that the input-side member never rotates.

On the other hand, when input torque is applied to the input-side member, the pillars of the retainer, which rotate in unison with the input-side member, push the rotationally rearward rollers into wide portions of the wedge-shaped spaces against the biasing force of the springs. This disengages the rollers from the fixed outer ring and the output-side member, thus unlocking the output-side member, so that rotation is transmitted from the input-side member to the output-side member through the torque transmitting means.

At that time, since the rotationally forward rollers are moved, relative to the output-side member, to the wider portions of the respective wedge-shaped spaces, the rotationally forward rollers will never engage the fixed outer ring and the output-side member.

Typically, in such locking type reverse input blocking clutches, in order to prevent separation of the rollers in the axial direction, the retainer is arranged to restrain the axial movements of the rollers toward one axial end of the clutch, and the fixed outer ring has a lid portion integral with the fixed outer ring and covering the other ends of the wedge-shaped spaces to prevent the axial movements of the rollers toward the other axial end of the clutch.

In this arrangement, while rotation is being transmitted from the input side to the output side, since the rollers revolve around the axis of the clutch together with the input-side member and the output-side member, the rollers slide on the inner peripheral cylindrical surface of the fixed outer ring and the opposed surface of the lid portion opposed to the rollers. Thus, the sliding resistance between the rollers and the fixed outer ring and between the rollers and the lid portion adds to the torque necessary to transmit rotation. To reduce power consumption, specifically the power consumption of the motor which applies input torque to the input-side member, it is necessary to reduce the torque necessary to transmit rotation.

One way to reduce the torque necessary to transmit torque would be to reduce the forces of the springs biasing the rollers, thereby reducing the sliding resistance between the rollers and the fixed outer ring and between the rollers and the lid portion. However, since the forces of the springs affect the locking performance, it is impossible to indefinitely reduce the forces of the springs. That is, if the forces of the springs are too small, it becomes more difficult, if reverse input torque is applied, to bring the rollers into engagement with the fixed outer ring and the output-side member, which could result in the output-side member being not locked.

SUMMARY OF THE INVENTION

An object of the present invention is to provide a locking type reverse input blocking clutch which needs a smaller amount of torque in transmitting rotation from the input side to the output side, while maintaining high locking performance.

As a first manner of achieving this object, a reverse input blocking clutch comprises a torque transmission arrangement disposed between an input-side member and an output-side member which are configured to rotate about a common axis, and the torque transmission arrangement is configured to transmit rotation of the input-side member to the output-side member with a slight angular delay. A fixed member has a cylindrical surface on one of an inner peripheral side and an outer peripheral side of the fixed member, and is arranged such that the cylindrical surface is opposed to one of an outer peripheral surface and an inner peripheral surface of the output-side member. The output-side member is formed with a plurality of cam surfaces arranged in a circumferential direction so as to be radially opposed to the cylindrical surface of the fixed member such that a wedge-shaped space which gradually narrows toward the respective circumferential ends thereof is defined between the cylindrical surface and each of the cam surfaces. Rollers are mounted in the respective wedge-shaped spaces, and elastic members are also mounted in the respective wedge-shaped spaces and bias the respective rollers into narrow portions of the wedge-shaped spaces. A retainer includes pillars inserted in both circumferential end portions of the respective wedge-shaped spaces, and is configured to restrict axial movements of the rollers toward one of two axial ends of the clutch. The retainer is coupled to the input-side member so as to rotate in unison with the input-side member. The fixed member includes a lid portion which has an opposed surface opposed to the rollers, and is configured to restrict axial movements of the rollers toward the other of the two axial ends of the clutch. At least one of the cylindrical surface of the fixed member and the opposed surface of the lid portion is a finished surface having no directionality (i.e., no directional lay of machining or polishing marks).

In the above-described locking type reverse input blocking clutch, by forming a finished surface having no directionality on at least one of the cylindrical surface of the fixed member and the opposed surface of the lid portion opposed to the lid portions, which are brought into sliding contact with the rollers while rotation is being transmitted from the input side to the output side, it is possible to reduce the sliding resistance between the rollers and the fixed member without reducing the biasing forces of the elastic members for engaging the rollers.

The finished surface having no directionality may be formed by barrel polishing.

As a second manner of achieving the above object, a reverse input blocking clutch comprises a torque transmission arrangement disposed between an input-side member and an output-side member which are configured to rotate about a common axis, and the torque transmission arrangement is configured to transmit rotation of the input-side member to the output-side member with a slight angular delay. A fixed member has a cylindrical surface on one of an inner peripheral side and an outer peripheral side of the fixed member, and is arranged such that the cylindrical surface is opposed to one of an outer peripheral surface and an inner peripheral surface of the output-side member. The output-side member is formed with a plurality of cam surfaces arranged in a circumferential direction so as to be radially opposed to the cylindrical surface of the fixed member such that a wedge-shaped space which gradually narrows toward the respective circumferential ends thereof is defined between the cylindrical surface and each of the cam surfaces. Rollers are mounted in the respective wedge-shaped spaces, and elastic members are mounted in the respective wedge-shaped spaces and bias the respective rollers into narrow portions of the wedge-shaped spaces. A retainer which includes pillars is inserted in both circumferential end portions of the respective wedge-shaped spaces, and is configured to restrict axial movements of the rollers toward one of two axial ends of the clutch. The retainer is coupled to the input-side member so as to rotate in unison with the input-side member. The fixed member includes a lid portion which has an opposed surface opposed to the rollers, and is configured to restrict axial movements of the rollers toward the other of the two axial ends of the clutch. A protrusion or a recess may be formed on at least one of the opposed surfaces of the lid portion and each roller that are opposed to each other. With this arrangement, as with the first means, it is possible to reduce the sliding resistance between the rollers and the lid portion without reducing the biasing forces of the springs for pushing the rollers into the narrow portions of the wedge-shaped spaces.

As a specific arrangement of the second manner of achieving the object, an annular protrusion or an annular recess may be formed on the opposed surface of the lid portion opposed to the rollers, or the other end surfaces of the rollers, i.e., their end surfaces opposed to the lid portion may be entirely formed into hemispherical surfaces.

As a third manner of achieving the above object, a reverse input blocking clutch comprises a torque transmission arrangement disposed between an input-side member and an output-side member which are configured to rotate about a common axis, and the torque transmission arrangement is configured to transmit rotation of the input-side member to the output-side member with a slight angular delay. A fixed member has a cylindrical surface on one of an inner peripheral side and an outer peripheral side of the fixed member, and is arranged such that the cylindrical surface is opposed to one of an outer peripheral surface and an inner peripheral surface of the output-side member. The output-side member is formed with a plurality of cam surfaces arranged in a circumferential direction so as to be radially opposed to the cylindrical surface of the fixed member such that a wedge-shaped space which gradually narrows toward the respective circumferential ends thereof is defined between the cylindrical surface and each of the cam surfaces. Rollers are mounted in the respective wedge-shaped spaces, and elastic members are mounted in the respective wedge-shaped spaces and bias the respective rollers into narrow portions of the wedge-shaped spaces. A retainer includes pillars inserted in both circumferential end portions of the respective wedge-shaped spaces, and a first roller restricting portion is configured to restrict axial movements of the rollers toward one of two axial ends of the clutch. The retainer is coupled to the input-side member so as to rotate in unison with the input-side member, and the retainer includes a second roller restricting portion configured to restrict axial movements of the rollers toward the other of the two axial ends of the clutch. With this arrangement, the rollers are kept out of contact, at either end surface thereof, with the fixed member.

The second roller restricting portion of the retainer may be an annular portion integrally connected to the other ends of the pillars, or protrusions circumferentially protruding from the other ends of the respective pillars.

Advantages of the Invention

With the reverse input blocking clutch according to the present invention, by reducing the sliding resistance between the rollers and the fixed member, or by keeping both end surfaces of the rollers out of contact with the fixed member, it is possible to reduce the torque necessary to transmit rotation from the input side to the output side, thereby reducing power consumption, while maintaining high locking performance.

DETAILED DESCRIPTION OF THE INVENTION

Figure 1:
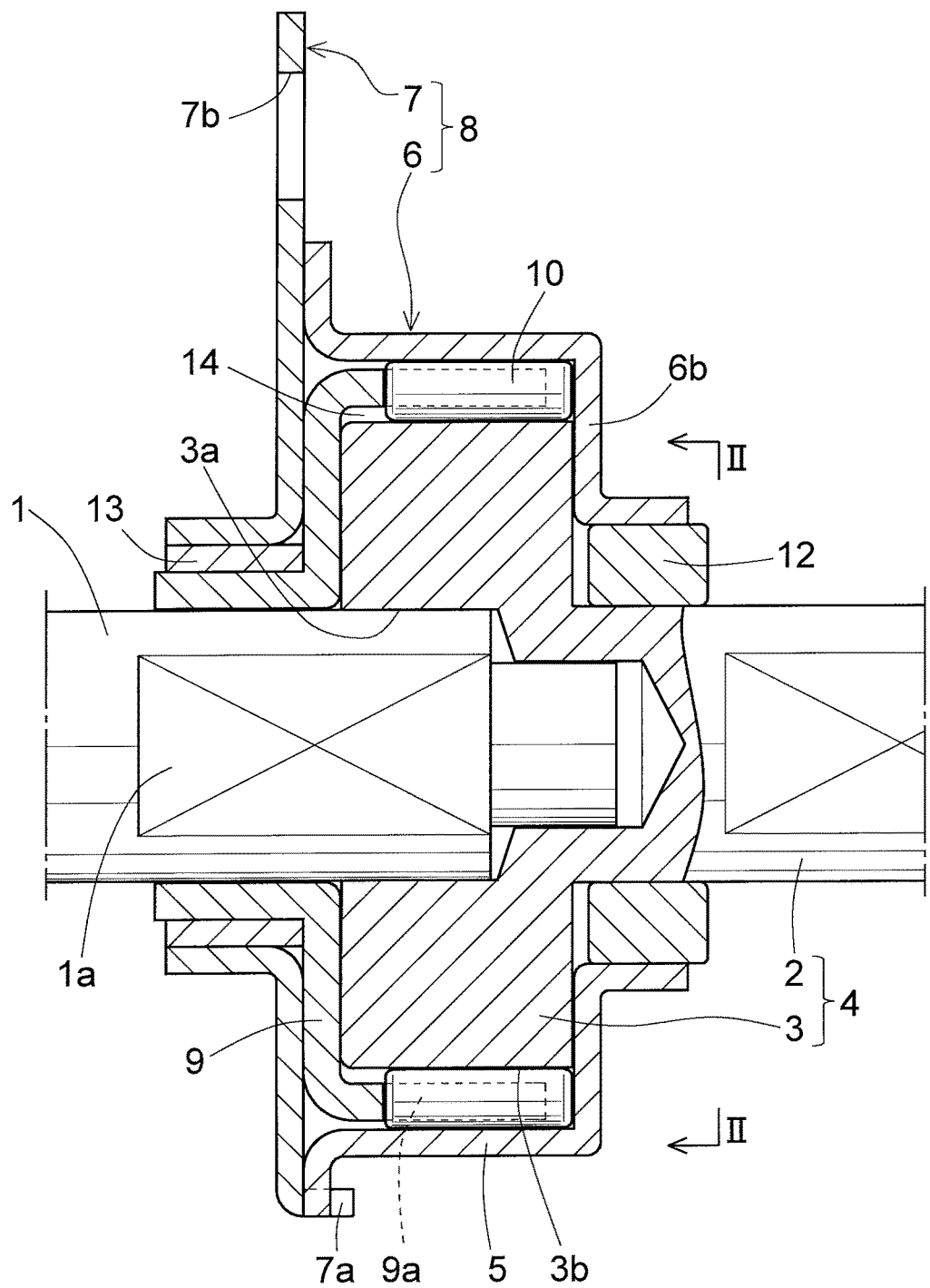
FIG. 1 is a vertical sectional front view of a reverse input blocking clutch of a first embodiment.
Figure 2:
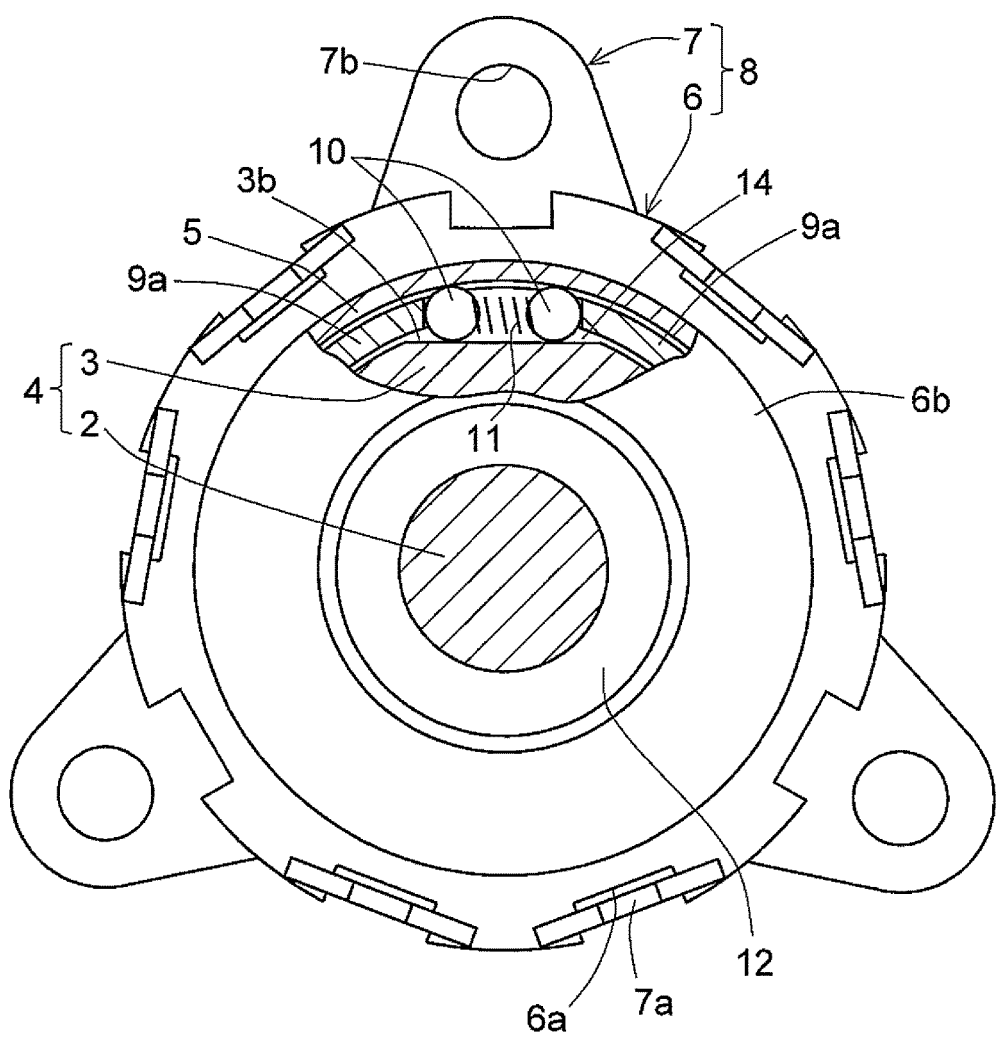
FIG. 2 is a sectional view taken along line II-II of FIG. 1.

The embodiments of the present invention are now described with reference to the drawings. FIGS. 1 and 2 show a reverse input blocking clutch of the first embodiment, which basically includes an input shaft (input-side member) 1; an output-side member 4 comprising an output shaft 2 and an inner ring 3 which is integral with the output shaft 2; a fixed member 8 comprising a housing 6 in the shape of a two-stage cylinder and including an outer ring 5 forming an integral portion of the housing 6, and a presser lid 7 through which the input shaft 1 extends; a retainer 9 including a plurality of pillars 9a inserted between the inner ring 3 and the outer ring 5; and rollers 10 and springs (elastic members) 11 disposed between the respective adjacent pairs of pillars 9a of the retainer 9. The springs 11 are compression coil springs.

The presser lid 7 of the fixed member 8 has a plurality of claws 7a formed on the outer peripheral edge thereof, and bent and fitted in cutouts 6a formed in the outer peripheral edge of a flange of the housing 6 provided at one end of the housing 6, thereby fixing the presser lid 7 to the housing 6. A bearing 12 is fitted in the inner periphery of a small diameter portion of the housing 6 at the other end thereof to rotatably support the output shaft 2. A bearing 13 is fitted in the inner periphery of a tubular portion of the presser lid 7 to rotatably support the retainer 9, which rotates in unison with the input shaft 1, as described below. The presser lid 7 includes three tongue-shaped protrusions protruding from the outer periphery of the presser lid 7, and each formed with a mounting hole 7b.

The input shaft 1 has an engaging portion 1a having two parallel flat surfaces on the outer periphery thereof, and inserted at its front half portion in an engaging hole 3a formed in the center of the inner ring 3. The engaging portion 1a has a small-diameter cylindrical portion at its distal end which is fitted in a hole formed in the center of the end surface of the output shaft 2 so that the input shaft 1 rotates about the same axis as the output shaft 2. While the engaging hole 3a of the inner ring 3 has a cross-sectional shape substantially identical to that of the engaging portion 1a of the input shaft 1, the engaging hole 3a and the engaging portion 1a are shaped such that when the latter is inserted into the former, a slight circumferential gap forms therebetween, whereby the rotation of the input shaft 1 is transmitted to the output shaft 2, which is integral with the inner ring 3, with a slight angular delay. The retainer 9 is fitted on the rear half portion of the engaging portion 1a of the input shaft 1 so that the input shaft 1 and the retainer 9 rotate in unison.

The outer periphery of the inner ring 3 is formed with a plurality of cam surfaces 3b arranged in the circumferential direction so as to radially face an inner peripheral cylindrical surface formed on the inner periphery of the outer ring 5. Each cam surface 3b and the inner peripheral cylindrical surface of the outer ring 5 define a wedge-shaped space 14 therebetween which gradually narrows toward the respective circumferential ends thereof. The pillars 9a of the retainer 9 are inserted on both sides of the respective wedge-shaped spaces 14, while a pair of the rollers 10 and one of the springs 11 are received in each wedge-shaped space 14 with the spring 11 disposed between the pair of rollers 10 such that the pair of rollers 10 are pushed into the respective narrow ends of the wedge-shaped space 14 by the spring 11.

In order to prevent the rollers 10, received in the wedge-shaped spaces 14, from separating axially from the clutch, the retainer 9 is configured such that its portions between the circumferentially adjacent pillars 9a restrain the axial movements of the rollers 10 toward a first axial end of the clutch, while the housing 6 includes a lid portion 6b provided between the small-diameter portion of the housing 6 at the other end of the housing 6 and the outer ring 5 to cover the other axial ends of the wedge-shaped spaces 14 so as to restrain the axial movements of the rollers 10 toward a second axial end of the clutch.

The inner peripheral cylindrical surface of the outer ring 5 of the housing 6, and the opposed surface of the lid portion 6b of the housing 6 opposed to the rollers 10 are smooth finished surfaces having no directionality formed by barrel polishing.

Since this reverse input blocking clutch is configured such that the rollers 10 are pushed into the narrow ends of the respective wedge-shaped spaces 14 under the biasing force of the springs 11, when reverse input torque is applied to the output shaft 2, the rotationally rearward rollers 10 engage the outer ring 5 of the fixed member 8 and the inner ring 3 of the output-side member 4, thereby locking up the output-side member 4, so that the input shaft 1 does not rotate.

On the other hand, when input torque is applied from a motor, not shown, the pillars 9a of the retainer 9, which rotates in unison with the input shaft 1, push the rotationally rearward rollers 10 to wider portions of the respective wedge-shaped spaces 14 against the biasing force of the springs 11, thereby disengaging the rollers 10 from the outer ring 5 and the inner ring 3, and unlocking the output-side member 4. When the input shaft 1 further rotates, and the engaging portion 1a engages the engaging hole 3a of the inner ring 3, rotation of the input shaft 1 is now transmitted to the output shaft 2 through the inner ring 3. (At this time, the rotationally forward rollers 10 move, relative to the inner ring 3, to the wider portions of the wedge-shaped spaces 14, and thus never engage the outer ring 5 and the inner ring 3.

While rotation is being transmitted from the input side to the output side in the above-described manner, the rollers 10 revolve around the input shaft 1 together with the input shaft 1 and the output-side member 4. At that time, the rollers 10 slide on the inner peripheral cylindrical surface of the outer ring 5 and the opposed surface of the lid portion 6b of the housing 6 opposed to the rollers 10 with little sliding resistance generated therebetween, because the inner peripheral cylindrical surface of the outer ring 5 and the opposed surface of the lid portion 6b are finished surfaces having no directionality (no directional lay of machining or polishing marks). This makes it possible to reduce torque necessary to transmit rotation, and thus to reduce power consumption, i.e., the power consumption of the motor from which input torque is applied to the input shaft 1, compared to conventional arrangements.

With this arrangement, since it is possible to reduce the sliding resistance between the rollers 10 and the lid portion 6b without the need to reduce the spring force of the springs 11 used to push the rollers 10 into the narrow portions of the wedge-shaped spaces 14, the clutch can be locked in position as stably and reliably as conventional clutches.

Of the surfaces to be brought into sliding contact with the rollers 10, only one of the inner peripheral cylindrical surface of the outer ring and the opposed surface of the lid portion 6b may be a finished surface having no directionality, but preferably, both of the above surfaces are finished surfaces having no directionality as in the embodiment so as to more effectively reduce the sliding resistance. The inner peripheral cylindrical surface of the outer ring 5 and the opposed surface of the lid portion 6b opposed to the rollers 10 may be finished by a process other than barrel polishing, provided such process is capable of forming finished surfaces having no directionality.

Figure 3:
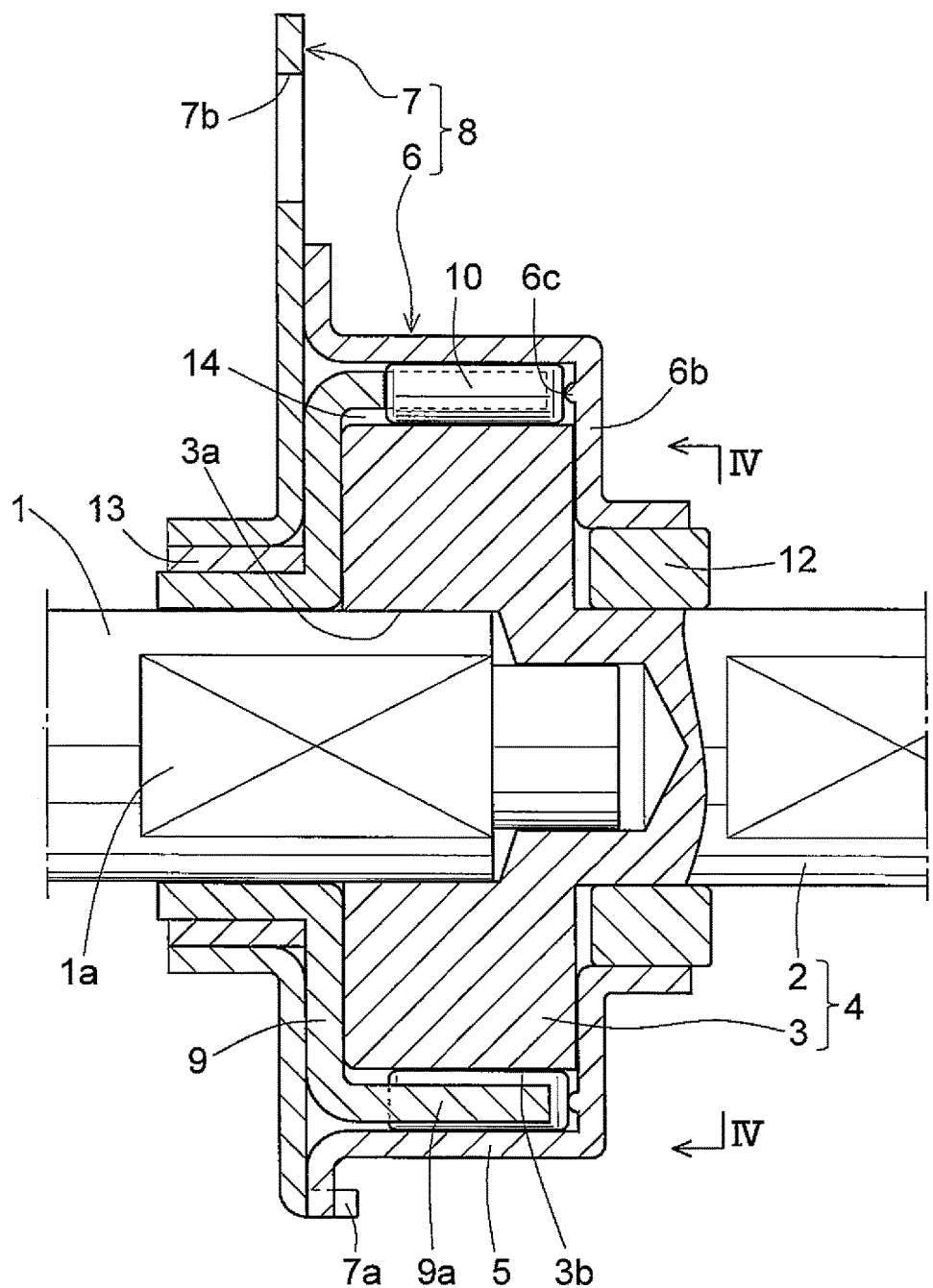
FIG. 3 is a vertical sectional front view of reverse input blocking clutch of a second embodiment.
Figure 4:
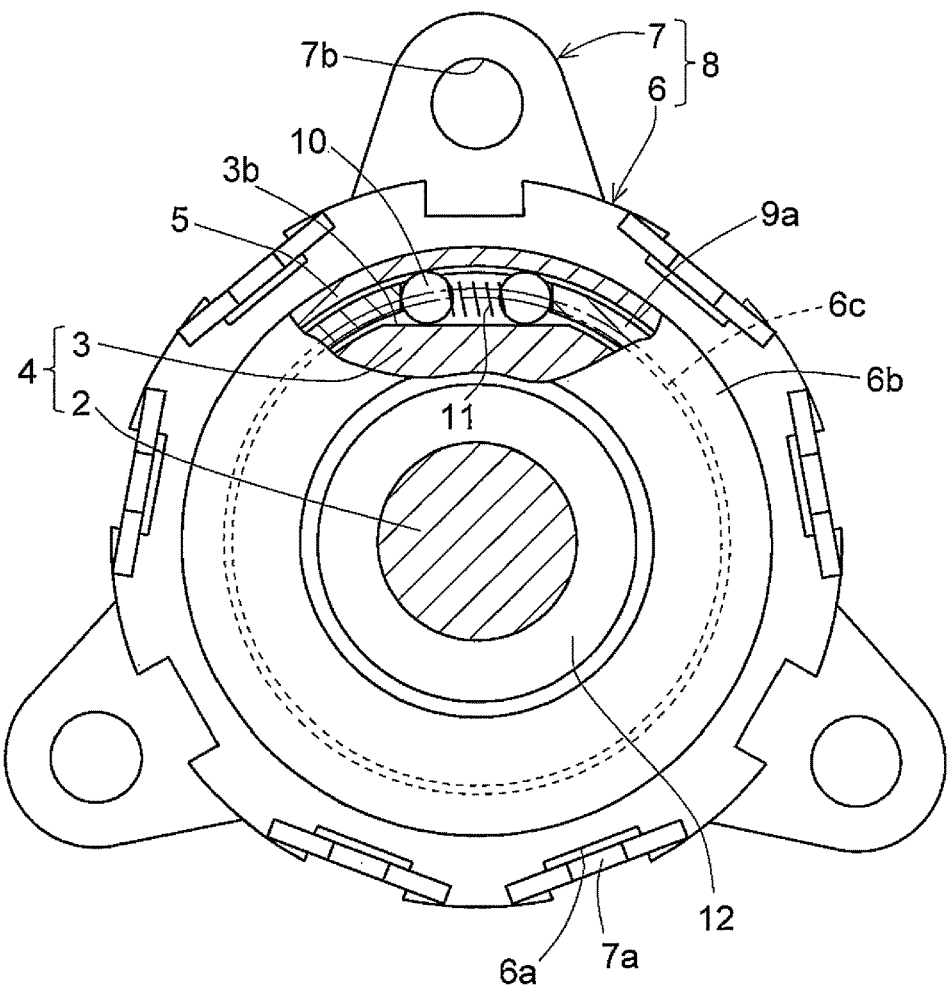
FIG. 4 is a sectional view taken along line IV-IV of FIG. 3.

FIGS. 3 and 4 show the second embodiment, which is substantially identical in its basic structure to the first embodiment, but differs therefrom in that the inner peripheral cylindrical surface of the outer ring 5 of the housing 6, and the opposed surface of the lid portion 6b of the housing 6 opposed to the rollers 10 are ordinary finished surfaces. Instead of the finished surface having no directionality, an annular protrusion 6c is formed on the opposed surface of the lid portion 6b opposed to the rollers 10. Members of this (and the below-described third embodiment) that are identical in function to members of the first embodiment are denoted by identical numerals, and their description is omitted.

In the second embodiment, while rotation is being transmitted from the input side to the output side, the rollers 10 slide on the annular protrusion 6c, which is formed on the lid portion 6b of the housing 6. Therefore, the sliding resistance between the rollers 10 and the lid portion 6b is smaller than when the roller end surfaces are brought into contact, over the entire area thereof, with the lid portion 6b, as in conventional arrangements. Thus, as in the first embodiment, it is possible to reduce the power consumption of the motor, while ensuring locking characteristics equivalent to those of conventional clutches.

Figure 5:
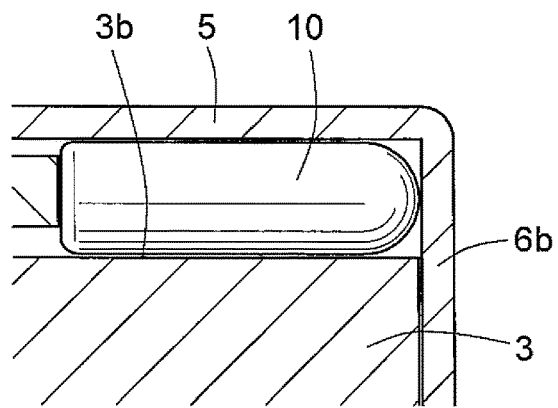
FIG. 5 is a vertical sectional front view showing a modified shape of a roller end surface.

In an alternative arrangement shown in FIG. 5, the opposed surface of the lid portion 6b of the housing 6 opposed to the rollers 10 is not provided with the annular protrusion 6c shown in FIGS. 3 and 4, and is a flat surface. Instead of providing the annular protrusion 6c, the other end surfaces of the rollers 10, i.e., their end surfaces opposed to the lid portion 6b, are entirely formed into hemispherical surfaces.

Figure 6A:
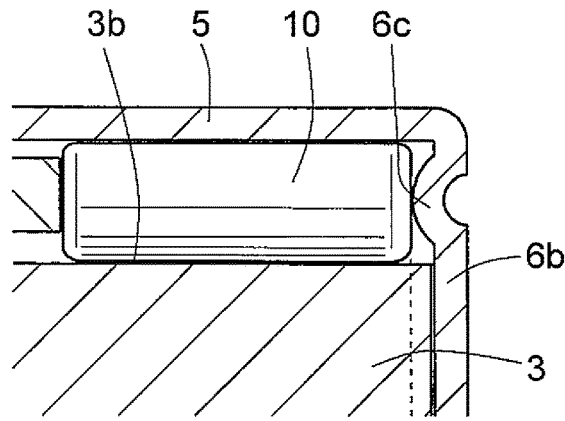
FIGS. 6(a) to 6(c) are vertical sectional front views showing modified lid portions of a housing.
Figure 6B:
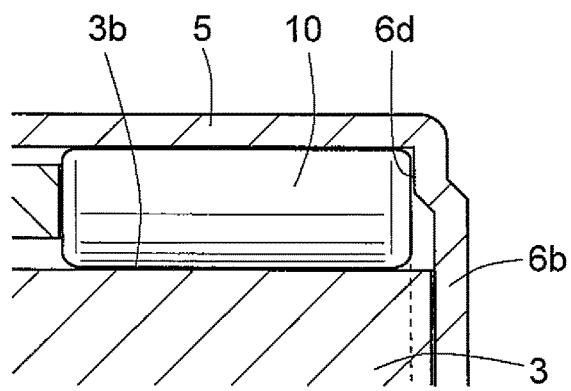
Figure 6C:
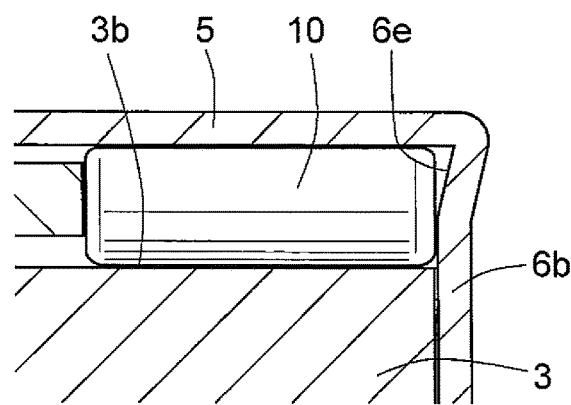

In further alternative arrangements shown, respectively, in FIGS. 6(a), 6(b) and 6(c), the shape of the lid portion 6b of the housing 6 is altered, with the shapes of the end surfaces of the rollers 10 unchanged. Of these modifications, in the modification shown in 6(a), the annular protrusion 6c is used, and the portion of the lid portion 6b where the annular protrusion 6c is provided has substantially the same wall thickness as the remaining portion of the lid portion 6b. In the modification shown in FIG. 6(b), an annular protrusion 6d is formed by bending the outer peripheral portion of the lid portion 6b. In the modification shown in FIG. 6(c), an annular recess 6e is formed at the outer peripheral portion of the lid portion 6b by bending the lid portion 6b. In these modifications, the annular protrusion 6c, 6d or the annular recess 6e can be more easily formed compared to the annular protrusion 6b shown in FIGS. 3 and 4, and thus the housing 6 can be more easily manufactured than the housing shown in FIGS. 3 and 4.

Figure 7:
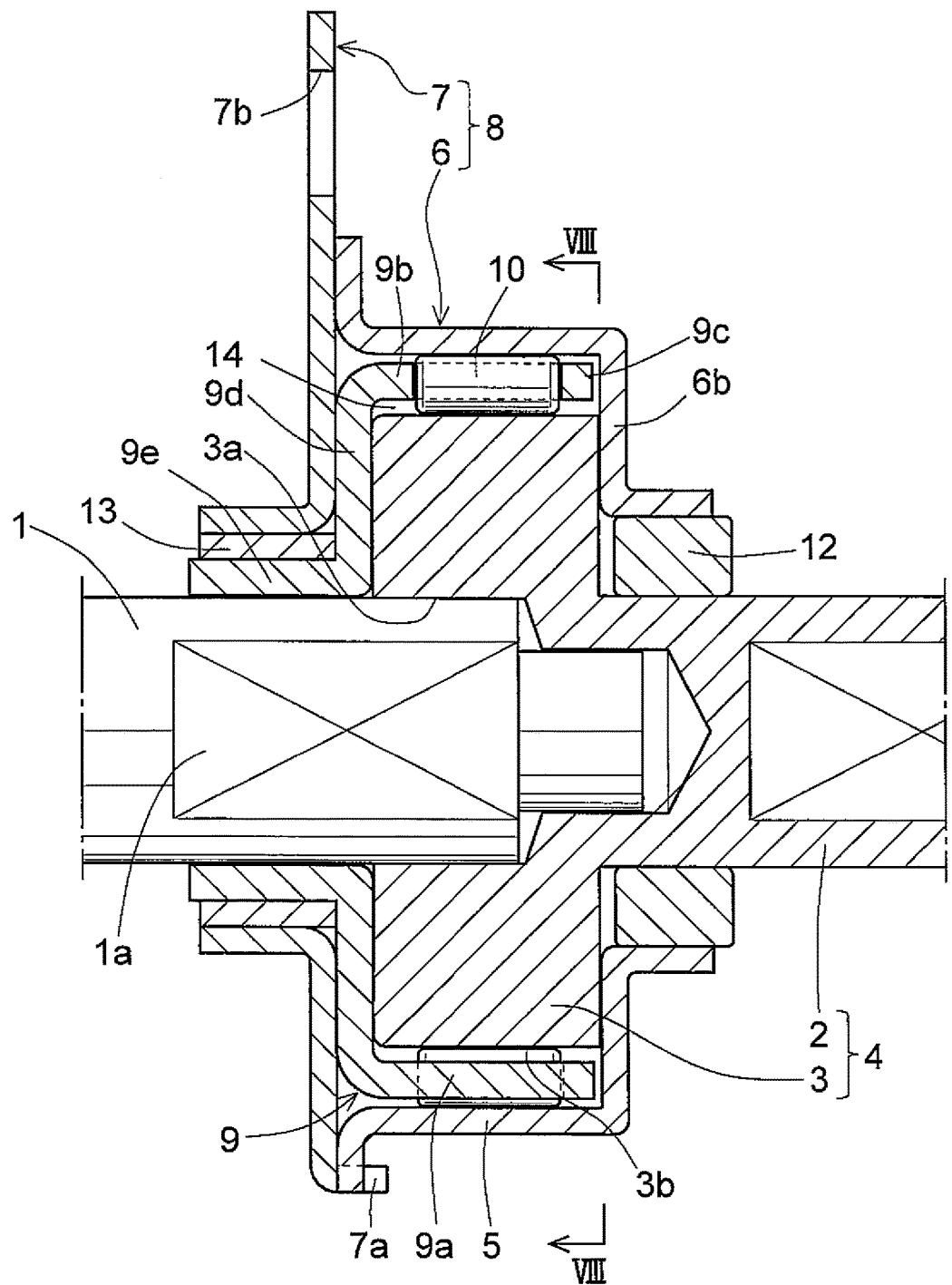
FIG. 7 is a vertical sectional view of a reverse input blocking clutch of a third embodiment.
Figure 8:
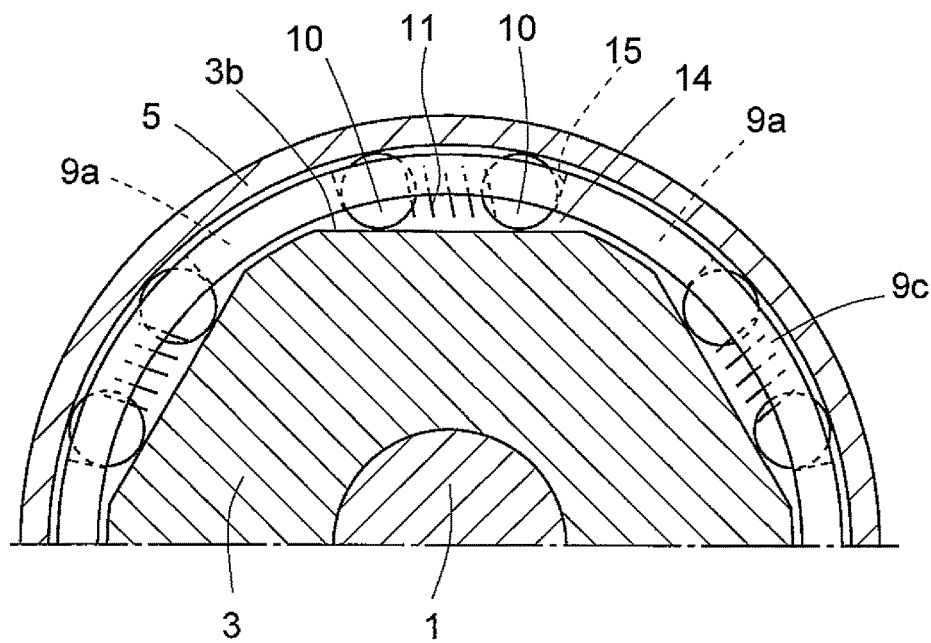
FIG. 8 is a sectional view taken along line VIII-VIII of FIG. 7.
Figure 9:
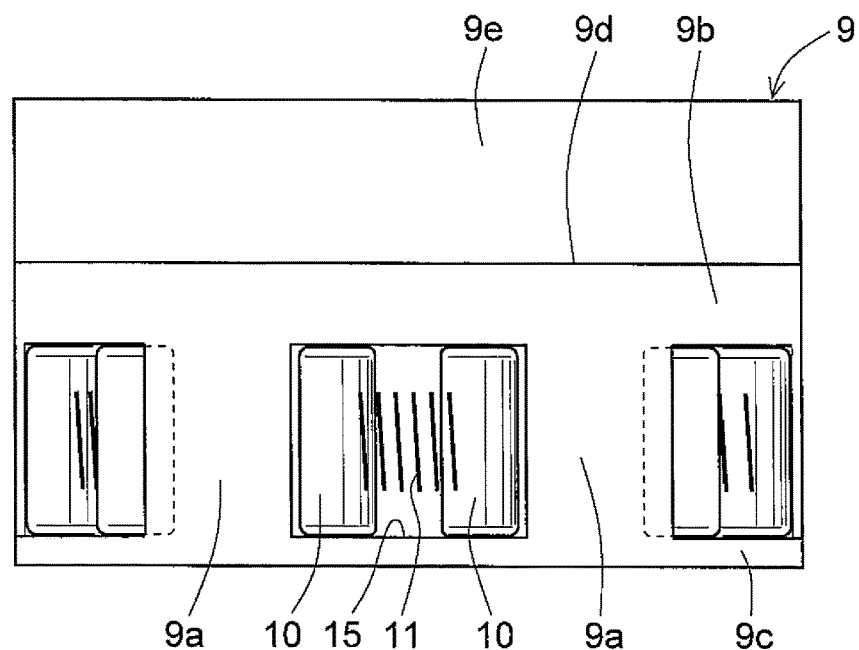
FIG. 9 is a plan view showing the positional relationship between a retainer and rollers of FIG. 7.

FIGS. 7 to 9 show the third embodiment, which is substantially identical in its basic structure to the first embodiment, but differs therefrom in that the inner peripheral cylindrical surface of the outer ring 5 of the housing 6, and the opposed surface of the lid portion 6b of the housing 6 opposed to the rollers 10 are ordinary finished surfaces. Instead of providing finished surfaces having no directionality, the shape of the retainer 9 is altered.

The retainer 9 of this embodiment comprises a plurality of pillars 9a extending in the axial direction between the inner ring 3 and the outer ring 5; a first annular portion 9b integrally connected to the first ends of the pillars 9a, i.e., their ends on the side of the one axial end of the clutch; a second annular portion 9c integrally connected to the second ends of the pillars 9a, i.e., their ends on the side of the other axial end of the clutch; a disk portion 9d formed with a hole and having an outer peripheral edge which is also the first end of the first annular portion 9b; and a tubular portion 9e axially extending from the inner peripheral edge of the disk portion 9b and fixedly fitted on the engaging portion 1a of the input shaft 1.

A pair of the rollers 10 and one of the springs 11 are received in each of a plurality of pockets 15 defined by the pillars 9a and the two annular portions 9b and 9c, of the retainer 9, with the spring 11 disposed between the pair of rollers 10. With this arrangement, the annular portion 9b serves as a first roller restricting portion that restricts the axial movements of the rollers 10 toward the first axial end of the clutch, while the other annular portion 9c serves as a second roller restricting portion which restricts the axial movements of the rollers 10 toward the second axial end of the clutch.

In the third embodiment, while rotation is being transmitted from the input side to the output side, axial movements of the rollers 10 are restricted by the two annular portions 9b and 9c of the retainer 9, i.e., by the first and second roller restricting portions such that each roller 10 is kept out of contact, at either end surface, with the fixed member 8. This makes it possible, as in the first and second embodiments, to reduce the power consumption of the motor, while ensuring locking characteristics equivalent to those of conventional clutches.

Figure 10:
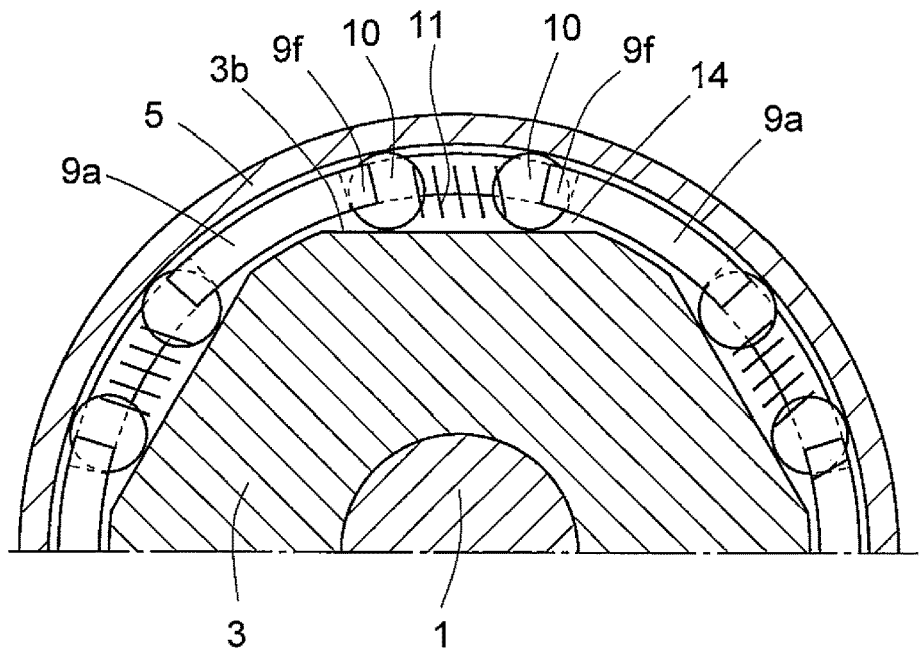
FIG. 10 is a sectional view corresponding to FIG. 8, and showing a modified shape of the retainer.
Figure 11:
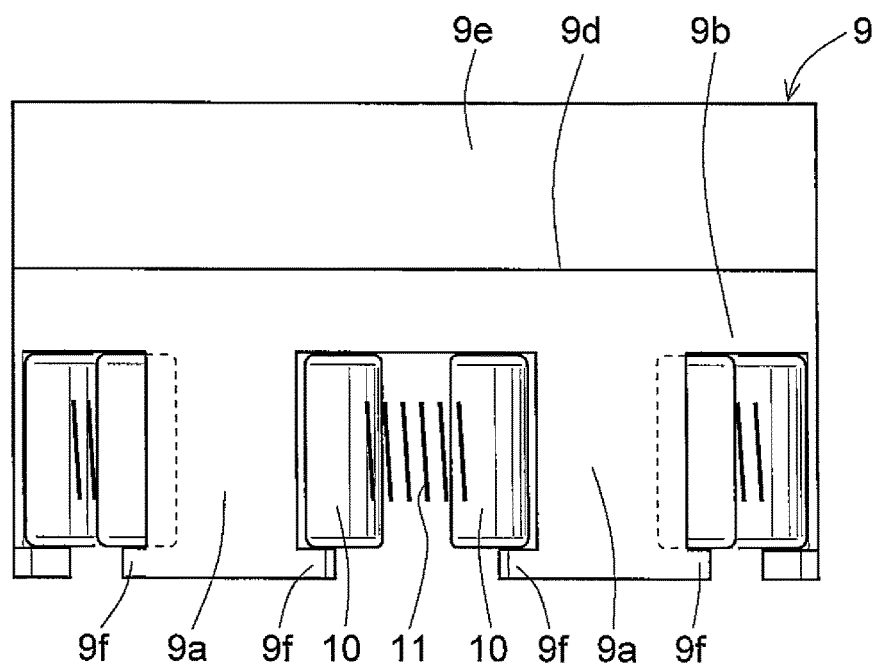
FIG. 11 is a plan view showing the positional relationship between a retainer and rollers of FIG. 10.

FIGS. 10 and 11 show a modification of the second roller restricting portion of the retainer 9 of the third embodiment. In this modified example, instead of the annular portion 9c shown in FIGS. 7 to 9, protrusions 9f are provided, as second roller restricting portions, which protrude in both circumferential directions from the other end portions of the respective pillars 9a to restrict axial movements of the rollers 10 toward the other axial end of the clutch.

DESCRIPTION OF THE NUMERALS

1. Input shaft (input-side member)
1a. Engaging portion
2. Output shaft
3. Inner ring
3a. Engaging hole
3b. Cam surface
4. Output-side member
5. Outer ring
6. Housing
6b. Lid portion
6c, 6d. Annular protrusion
6e. Annular recess
7. Presser lid
8. Fixed member
9. Retainer
9a. Pillar
9b. Annular portion (first roller restricting portion)
9c. Annular portion (second roller restricting portion)
9f. Protrusion (second roller restricting portion)

10. Roller
11. Spring (elastic member)
14. Wedge-shaped space
15. Pocket

What is claimed is:

1. A reverse input blocking clutch comprising: a torque transmission arrangement disposed between an input-side member and an output-side member which are configured to rotate about a common axis, the torque transmission arrangement being configured to transmit rotation of the input-side member to the output-side member with an angular delay; a fixed member having a cylindrical surface on one of an inner peripheral side and an outer peripheral side of the fixed member, the fixed member being arranged such that the cylindrical surface is opposed to one of an outer peripheral surface and an inner peripheral surface of the output-side member; wherein the output-side member has a plurality of cam surfaces arranged in a circumferential direction so as to be radially opposed to the cylindrical surface of the fixed member such that a wedge-shaped space which gradually narrows toward circumferential ends thereof is defined between the cylindrical surface and each of the cam surfaces; rollers mounted in each of the wedge-shaped spaces; elastic members, each of the elastic members being mounted in a respective one of the wedge-shaped spaces and biasing the respective rollers into narrow portions of the wedge-shaped spaces; and a retainer including pillars inserted in both circumferential end portions of the respective wedge-shaped spaces, the retainer being configured to restrict axial movements of the rollers toward a first one of two axial ends of the clutch, the retainer being coupled to the input-side member so as to rotate in unison with the input-side member; wherein the fixed member includes a lid portion having an opposed surface opposed to the rollers, the lid portion being configured to restrict axial movements of the rollers toward a second one of the two axial ends of the clutch, and wherein the opposed surface of the lid portion is a finished surface having no directional lay of machining or polishing marks, the finished surface being a barrel-polished finished surface.

* * * * *